United States Patent [19]

Broeren

[11] 3,997,875
[45] Dec. 14, 1976

[54] COMPUTER CONFIGURATION WITH CLAIM CYCLES

[75] Inventor: Johan Cornelis Broeren, Beekbergen, Netherlands

[73] Assignee: U.S. Philips Corporation, New York, N.Y.

[22] Filed: June 23, 1975

[21] Appl. No.: 589,338

Related U.S. Application Data

[63] Continuation of Ser. No. 420,267, Nov. 29, 1973.

[30] Foreign Application Priority Data

Jan. 8, 1973 Netherlands ............... 7300218

[52] U.S. Cl. ............................... 340/172.5
[51] Int. Cl.² ............................... G06F 13/00
[58] Field of Search ............... 340/172.5; 445/1

[56] References Cited

UNITED STATES PATENTS

| | | | |
|---|---|---|---|
| 3,398,405 | 8/1968 | Carlson et al. | 340/172.5 |
| 3,588,829 | 6/1971 | Boland et al. | 340/172.5 |
| 3,599,159 | 8/1971 | Creech et al. | 340/172.5 |
| 3,618,040 | 11/1971 | Iwamoto et al. | 340/172.5 |

Primary Examiner—Harvey E. Springborn
Attorney, Agent, or Firm—Frank R. Trifari; Daniel R. McGlynn

[57] ABSTRACT

The store of a computer configuration comprises a number of signalling bit locations. These locations are assigned to a peripheral apparatus or to a program stored in a store segment and indicate whether the peripheral apparatus or the program is accessible. For the modification of a signalling bit, a claim cycle is required which consists of successive read, modification, and write phases. In order to reduce the waiting time for other users during claims cycles, such cycles are always sub-divided into two parts, and if a claim cycle is being performed, this is indicated by the state of a claim flipflop. Further claim cycles are then blocked, but normal storage cycles remain permissible.

1 Claim, 9 Drawing Figures

COMPUTER CONFIGURATION WITH CLAIM CYCLES

This is a continutation, of application Ser. No. 420,267, filed Nov. 29, 1973.

The priority papers under 35 USC 119 are found in the parent application, Serial No. 420,267, now abandoned.

The invention relates to a computer configuration, comprising a data processor with at least two active units and a storage unit with at least one signalling bit location, the information of which indicates an activity status of a part of the computer configuration, the information being addressable and subsequently modifyable in reaction to a first read command from a first active unit, it being possible to write back the said information in reaction to a first write command from the first active unit, furthermore comprising a number of second bit locations, the information of which is addressable in reaction to a second read command from an active unit and can be written back in reaction to a second write command from an active unit, and furthermore comprising a bistable status element which can be set for signalling an "activity" state by the beginning of a read command in order to block further read and write commands, and which can be set to a "rest" state by the end of a write command. Computer configurations of this kind are known. This storage bits may be part of a storage word. The bits can be read, modified, and written back. One of these three operations can be omitted. The information can be transported from or to elsewhere. There may be signalling bits which indicate the activity status of a part of the configuration, for example, a storage segment or a peripheral apparatus. The parts of the configuration react differently in accordance with the activity status.

The sequence of operations is reading, modifying, writing. Sometimes reading and writing are always effected in the same phase of a two-phase storage cycle; in that case at least two storage cycles are required for modification, The contents of the storage unit can be protected against further read and write commands during this time. In the case of more active units such as processors, the waiting time may be too long for the other active units. A cycle can consist of one phase in which reading or writing or modifying take place. In an asynchronous system the durations are arbitrary. Modification always requires addition time.

Each unit can have its own store, but very much storage space is then required. Certain information must be signalled to more active units, while this information is stored only once; for example, this is the case for the activity status of a peripheral apparatus.

The omission of the said protection has an increasing effect on the speed, but the reliability decreases because during the modification of the word by a first active unit, a second active unit can read and modify the same word. The information of the relevant word is then no longer unambiguously defined and the word will be mutilated when written back. This problem is avoided by making the first active unit operate in a "claim cycle," thus reserving (part of) the store. The waiting time may then be too long again for a second active unit.

The problem is solved according to the invention which is characterized in that at least one claim unit is provided which receives, prior to said first read command, a claim command from the first active unit by which the claim unit, if it was previously in the position "free," is set to the position "claimed," and which also receives, after said first write command, a release command from the first active unit by which the claim unit is reset to the position "free," a signal on the output of the Claim unit being capable, if this unit was previously in the "claimed" state due to a claim command given by another active unit, of generating a blocking signal by means of which said first read command and first write command can be blocked, said second read command and second write command being allowed passage while ignoring the signal on the output of the claim unit, the bistable status element, moreover, being settable to the "rest" state by the end of a read command and being settable to the "active" state by the beginning of a write command, it thus being possible for second read commands and second write commands to be active between said first read command and first write command, but first read commands and first write command being blockable. The contents of the storage unit can thus, be protected without loss of flexibility. If a signalling bit is not modified, second read/write commands can suffice. A claim unit can cover a plurality of signalling bits. If a signalling bit is treated for possible modification no claim cycle as regards the relevant signalling bit or group of signalling bits may be in progress because the information of the signalling bit is then undefined. By sub-dividing the claim cycle into two parts, second read commands and write commands can be freely executed in the intervals. Normal cycles can also be sub-divided. There may be two kinds of storage field: "general" fields which are accessible to more active units, and "special" fields which are reserved for one active unit. The invention provides a favorable solution for the "general" storage fields.

It is an advantageous aspect of the invention that a first read command or first write command which is allowed to pass under the control of a signal representing the absence of a blocking signal on the output of the claim unit can be applied to a provided priority determining unit as a second read command or write command, respectively. All non-blocked read commands and write commands are thus handled with the same priority, and the construction of the priority unit remains simple.

It is another advantageous aspect of the invention that a bistable claim element and a bistable status element are provided for each of a number of storage fields of the storage unit for each of the active units. A systematic construction is thus obtained.

It is a further advantageous aspect of the invention that a provided switching unit which links the active units and the storage unit comprises the claim elements and the status elements. A fast signal flow is thus obtained, and active units of a different type can be connected.

The invention will be described in detail with reference to a number of Figures.

The computer configuration to be described comprises active units, a switching unit, and a storage unit. Examples of active units are data processors, S/O controls units, and I/O processors. Peripheral apparatus may be, for example, magnetic disc stores, telex cables, keyboards or reading machines. The storage unit can comprise one or more stores. The switching unit interconnects the other parts of the computer configuration.

Figure 1:
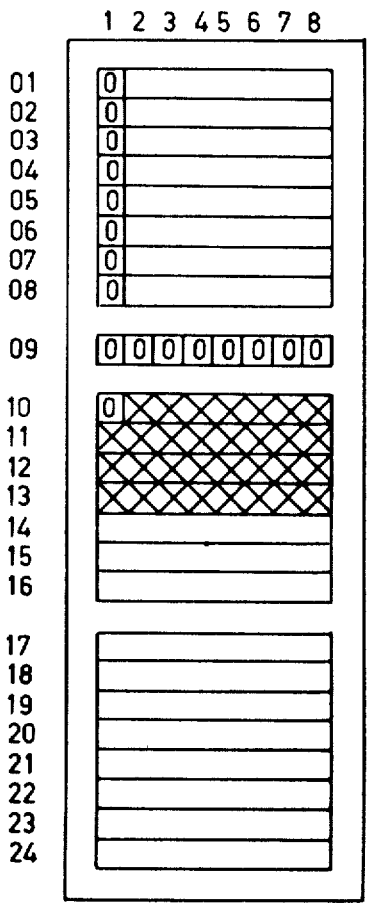
FIG. 1 shows a diagram of a store comprising signalling bit locations.

FIG. 1 shows an embodiment of a matrix store. This store comprises 24 words 01....24, each comprising 8 bits which are numbered 011.....018 for the first word, 021....028 for the second word, and so on till, 241.....248 for the last word. The bits 011, 021, 031, 041, 051, 061, 071, 081, 091....098 and 101 are denoted by a circle as a signalling bit. The information can be used in two ways. In a "normal" cycle the word is read and is written back unmodified, the information may be used. Information which is of importance for one active unit only may be modified in a normal cycle.

Each of the words 01, 02....08 contains information of a peripheral apparatus, for example, a telex cable. If the signalling bit thereof is 1, the cable is active, for example, reserved by a processor for transporting information. The second bit can indicate whether transmission or reception takes place. The remainder indicates one or more addresses whereto or wherefrom information is transported. When the cable becomes inactive, the signalling bit must be set to 0. If there are many cables involved, for example, only the active cables participate in a time multiplex so as to reduce the waiting time. A message is preceded, for example, by a start signal which sets the signalling bit of one of the words 01....18 to 1; the remainder of the information of the message is stored at the store address specified by the remainder of the relevant word. The message is terminated by a stop signal by which the relevant signalling bit is reset to 0 and the address is modified, so that a new address for a next message is produced. During transmission, start and stop signals are generated by an arithmetic unit. The address indicates where reading takes place.

Similarly, a central processor can request new data, for example, if the peripheral apparatus is a reading machine and after recognition by the central processor, the latter requests information of a new character.

The word 09 contains interruption information and completely consists of signalling bits. For example, but 091 indicates whether the mains voltage is sufficient, bit 092 whether the operating temperature is within given limits, bit 093 whether the fans operate, bit 094 whether the magnetic discs rotate at the correct speed. If all bits are 1, unrestricted operation is possible. If one or more bits are 0 steps must be taken: for example, it is necessary to stop or a switch-over must be made to an emergency power generating set. The information can alternatively be used for signalling a defective peripheral apparatus. If an interrupt signal occurs, one signalling bit is rendered 0. If two interrupt signals arrive, they are sucessively dealt with. Consequently, a second active unit can read the word only after the write phase of the claim cycle.

The words 10.....16 constitute a segment in which, for example, a program is stored by means of which the sine of an angle is calculated. The program instructions are stored in the words 10....13. The words 14....16 are reserved for intermediate data which are obtained in the program and which must be stored for some time. If the signalling bit (101) is 1, a sine calculation takes place. The words 17....24 are free. If two arithmetic units both wish to calculate a sine (of different angles), this can be performed by means of the program instructions from the words 10....13. The words 14....16 are available for intermediate data. The first arithmetic unit can then use the words 10....16. The second unit can use the fixed information of the words 10....13, but must store the intermediate data elsewhere, for example, in the words 17....19. The unit now operates as follows. If an arithmetic unit wishes to calculate a sine, it sets the signalling bit (bit 101) to 1. A second arithmetic unit cannot do this and must, therefore, use words other than the words 14.....16 for storing intermediate data. It can use the contents of the words 10...13, possibly also that of the words 14.....16, but the information cannot be modified thereby. Consequently, if the program contains the instruction: "store the intermediate result in word location 14," this is translated by the second arithmetic unit as "....word location 17." After completion of the calculation, the first arithmetic unit sets bit 101 to 0.

Figure 2:
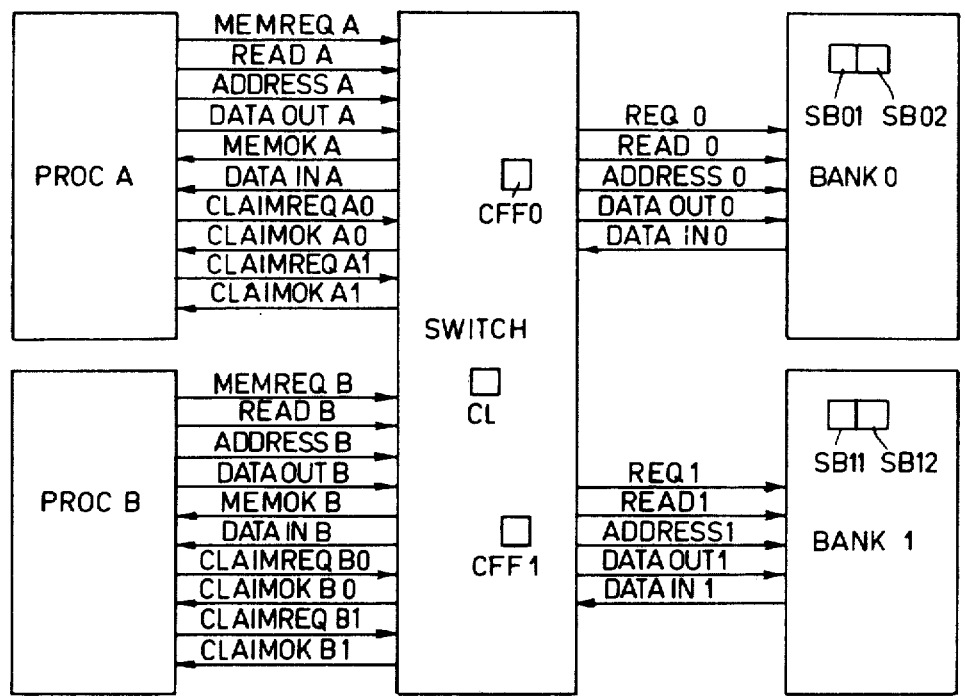
FIG. 2 is a diagrammatic representation of a computer configuration according to the invention.

FIG. 2 is a diagrammatic representation of a computer configuration according to the invention. The computer configuration comprises two stores BANK0, 1, one switching unit SWITCH which controls the access to the stores and the claims, and two active units PROC A, B. Each store contains two signalling bit locations SB 01, 02, 11, 12. The switching unit SWITCH comprises two claim units CFF 0,1.

Figure 3:
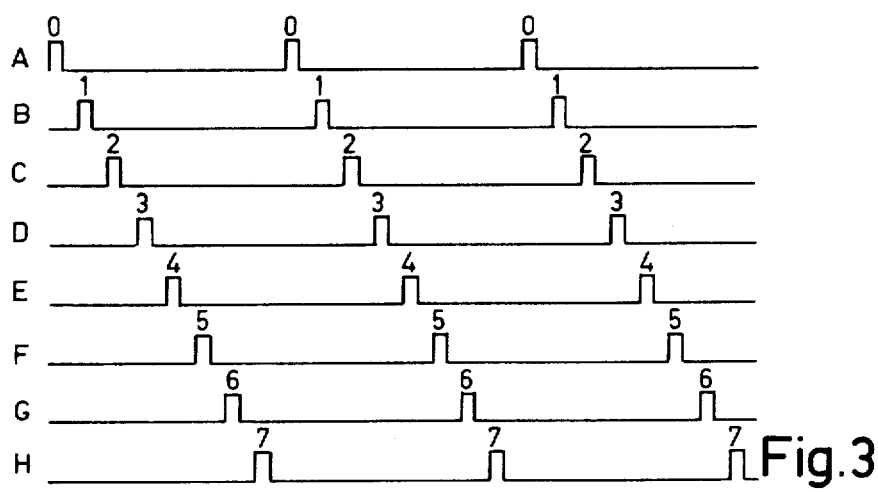
FIG. 3 shows an 8-pulse clock pulse cycle.

The active units PROC A, B can process and/or transport information to or from peripheral equipment which is connected thereto but which is not shown. They could alternatively be fast peripheral apparatus themselves. Also provided is a clock CL which supplies the 8-fold clock pulse on the lines A to H. Shown in FIG. 3 the connections between the switching unit SWITCH and the other parts of the computer configuration may be multiple and form specific interfaces. The designations of the signals will be discussed hereinafter. Further devices (not shown) can block the reading of a word if it contains a signalling bit and the read command is not accompanied by a claim command. The relevant recognition can be effected in that the switching unit SWITCH comprises a small store containing the addresses of words in which signalling bits are present. A store request for these words must then satisfy one of two requirements:

(a) a second read write cycle is concerned in which there may be not modification, (b) a claim cycle is concerned. By comparing the requested address with the stored addresses, it can be further tested whether the said requirements are satisfied and if so an approval signal is generated.

Figure 4:
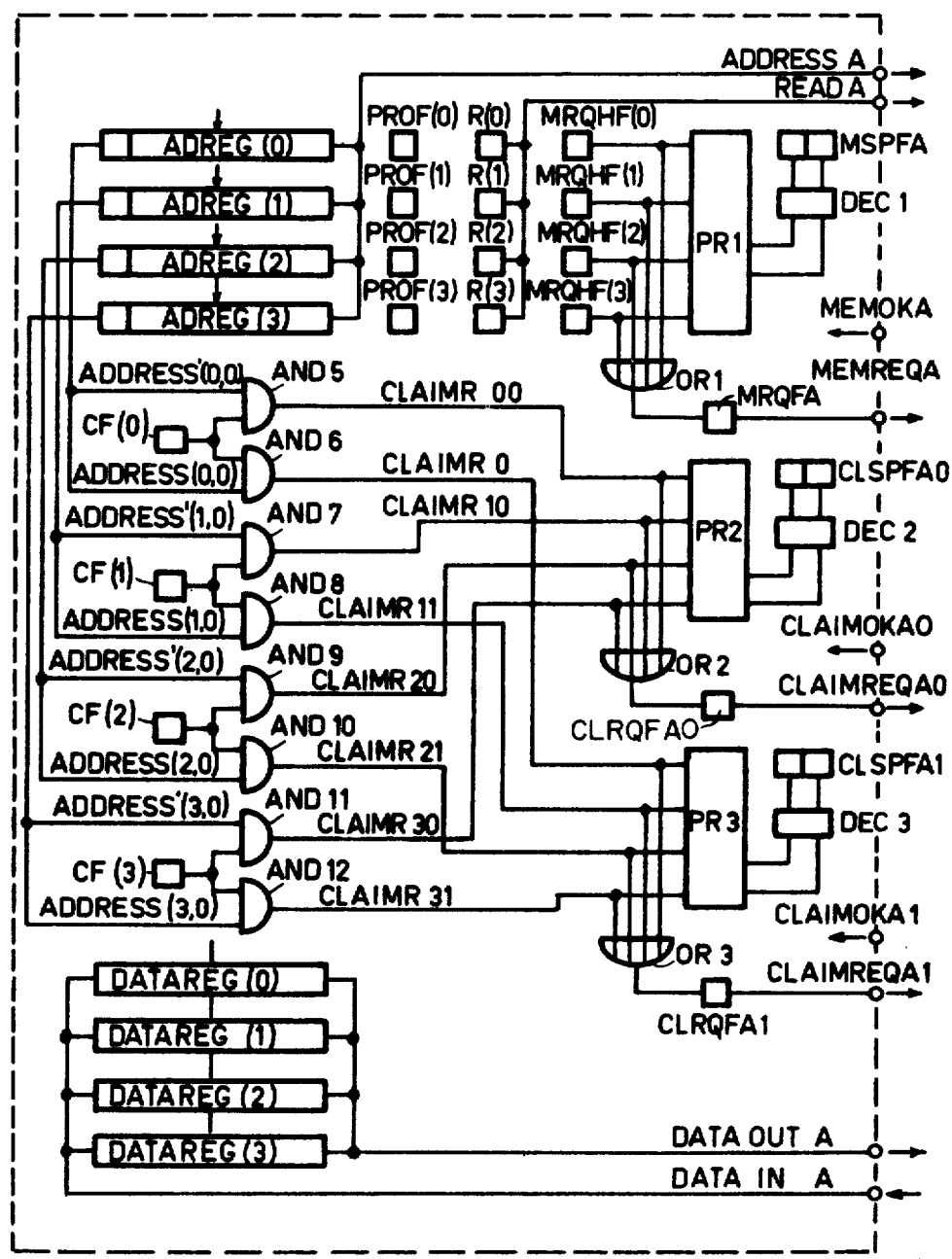
FIG. 4 shows an active unit.
Figure 5:
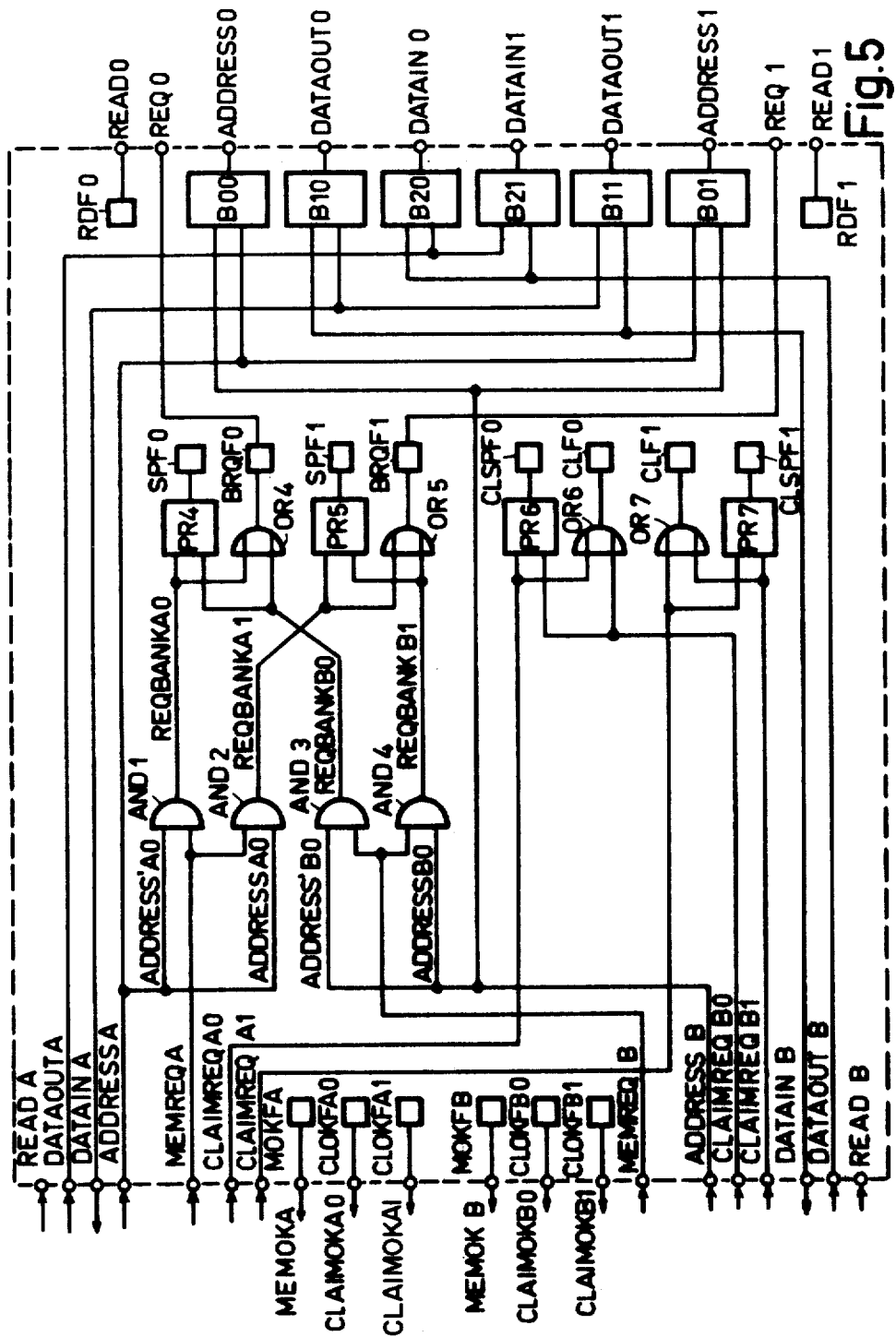
FIG. 5 shows a switching unit.
Figure 6:
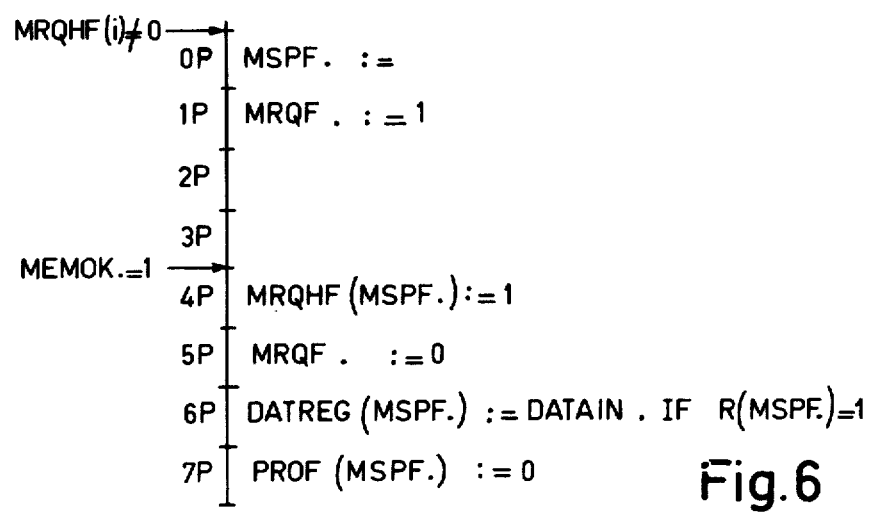
FIG. 6 shows a first counter.

In the present example, four processes can simultaneously take place in each active unit PROC A, B, for example, according to an internal time multiplex system. Each active unit comprises a circuit as shown in FIG. 4, and a first counter as diagrammatically shown in FIG. 6. The switching unit SWITCH comprises a circuit as shown in FIG. 5 and a second counter as diagrammatically shown in FIG. 7. First a normal cycle will be described. It is assumed that the process 2 in the active unit PROC A wishes an access to the store BANK0. The associated bistable element PROF 2 is then set to the 1-state. The process is then stopped. If a read access is concerned, the bistable element R 2 is immediately set to the 1-state is maintained therein, and address information is applied to the address register ADREG 2. If a write access is concerned, the bistable element R 2 is set to the 0-state or is maintained therein, and data are applied to the information register DATAREG 2. Finally, the signal sets the bistable element MRQHF 2 to the 1-state. The first bit in the register ADREG 2 indicates whether the address is present in BANK0 or BANK1. Further control is provided by the clock CL and the first counter of FIG. 6. The counters are denoted as vertical lines along which the positions are shown as intervals, each being controlled by one of the 8 clock pulses 0p....7p. The necessary conditions for counting on are indicated on the left-hand side by arrows. To this end, the relevant signals can arrive, together with the associated clock pulse, at a logic ANDgate which is not shown. A clock pulse, for example, the clock pulse $j$ ($j = 0.....7$), is active only if the counter was in the position ($j-1$). For $j=0$, this is the position 7. Under the control of a clock pulse, the counter is advanced one position after which the operations shown at the right are performed.

If one or more of the bistable elements MRQHF i are in the 1-state, denoted by MRQHF i $\neq$ 0, after a clock pulse 7, the next clock pulse 0 is allowed to pass. Under the control thereof, possible assisted by the priority determining unit PR1 which determines the priority in the case of a plurality of set bistable elements MRQHF i, the number of the process is applied to the decoder DEC1 and is subsequently stored in binary code in the two bistable elements MSPFA. These elements can possibly also control BUS-lines for the distribution of the data over a number of users connected to said BUS-lines. Consequently, if it is stored in MSPFA that i has the value 2, the contents of the registers ADREG 2, R 2 and possibly DATREG 2 are available as the signals ADDRESS A, READ A and DATAOUT A for the switching unit SWITCH. In the case of a read access, information data can be received as the signals DATAINA.

Under the control of the next clock pulse 1, the bistable element MRQFA is set to the 1-state via the logic OR-gate OR 1, with the result that a signal MEMREQA becomes 1, and the switching unit SWITCH senses the storage request. The next clock pulses 2 and 3 switch the first counter to the position 3.

Figure 7:
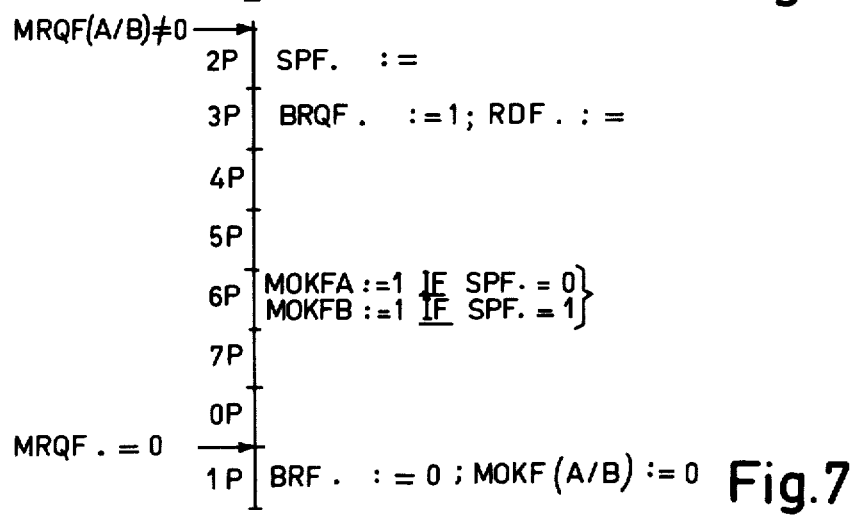
FIG. 7 shows a second counter.

If at the end of the above clock pulse 1 the bistable element MRQFA and/or a corresponding element in the active unit PROCB is in the 1-state, the second counter of FIG. 7 is activated by the next clock pulse 2. The signals MEMREQA arrives as a logic 1 on the two logic AND-gates AND1, 2 of FIG. 5. The signals ADDRESSA0 and ADDRESS'A0 contain the information of the first bit of the register ADREG (2), i.e, in noninverted form and in inverted form, respectively. Consequently, if it were a 0 (the address is in BANK0), the signals REQBANKA0 becomes 1 via the logic ANDgate AND1; for BANK1 the said first bit must be a 1. The branching paths for the signal ADDRESSA have been omitted for the sake of simplicity. If there is at least one request for the store BANK0, a 1-signal is produced via the logic OR-gate OR4. In reaction to the next clock pulse 2, the information as regards which active unit is granted access is stored in the bistable element SPF0 via READ0 priority determining unit PR4 (for the case where both active units PROCA,B wish access to BANK0). Under the control of the clock pulse 3 the bistable element BRQF0 is set to the 1-state, with the result that the signal REQ0 becomes 1 so as to signal to request. The remainder of the ADDRESS generated by the active unit PROCA arrives, via the distributor B00, as the signal ADDRESS0 at the store BANK0. Furthermore, the bistable element RDF0 is set to the position corresponding to the signal READA. The signal READ9 is thus formed. The last two operations are controlled by the position of the bistable element SPF0. The distributor B20 transports the data of the active unit PROCA to the store in the case of a write access. At the end of the clock pulse 3, it is, therefore, known in the store BANK0 if and where information must be read or written: this operation can then start. The next clock pulses 4 and 5 advance the second counter (the first counter is stationary. In reaction to the next clock pulse 6, the bistable element MOFKA is set to the 1-state (it is assumed that the request of PROCA is granted), with the result that the signal MEMOKA is 1. The bistable element MOFKA thus operates as a status element between the store BANK0 and the active unit PROCA. The granting has thus been signified. The next clock pulses 7 and 0 set the second counter to the position 0. At the beginning of the next clock pulse 4, the signal MEMOKA is present and the bistable element MRQHF 2 specified in the bistable elements MSPFA is set to the 0-state. In reaction to the clock pulse 5, the bistable element MRQFA is set to the 0 state. In reaction to the clock pulse 6, the information signals DATAOUT0 are read, if the bistable element R2 is in the 1-state, into the register DATAREG2, as the data DATAINA via the distributor B10. In the reaction to the next clock pulse 7, the bistable element PROF2 is set to the 0-state, and the process can be resumed as above. If the bistable element MRQFA is in the 0-state at the end of the clock pulse 0, the bistable elements BRQF0 and MOFKA are also reset to the 0-state. Corresponding parts are present for the active unit PROCB and, as is also shown in FIG. 5, for the store BANK1. Consequently, the duration of the entire read or write cycle is two clock pulse cycles. The actual writing/reading of the store takes place between the clock pulse 5 of the first clock pulse cycle and the clock pulse 6 of the second clock pulse cycle. Four clock pulse cycles are required for reading and writing combined. The store accesses can simultaneously be in progress, for example, PROCA-BANK0 and PROCB-BANK1.

Figure 9:
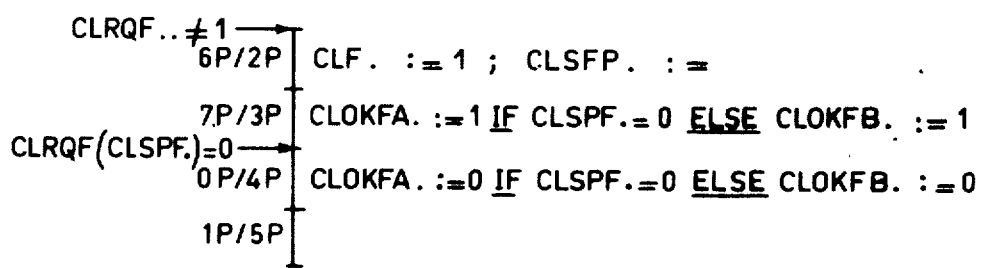
FIG. 9 shows a fourth counter, all to be used in a computer configuration according to the invention.
Figure 8:
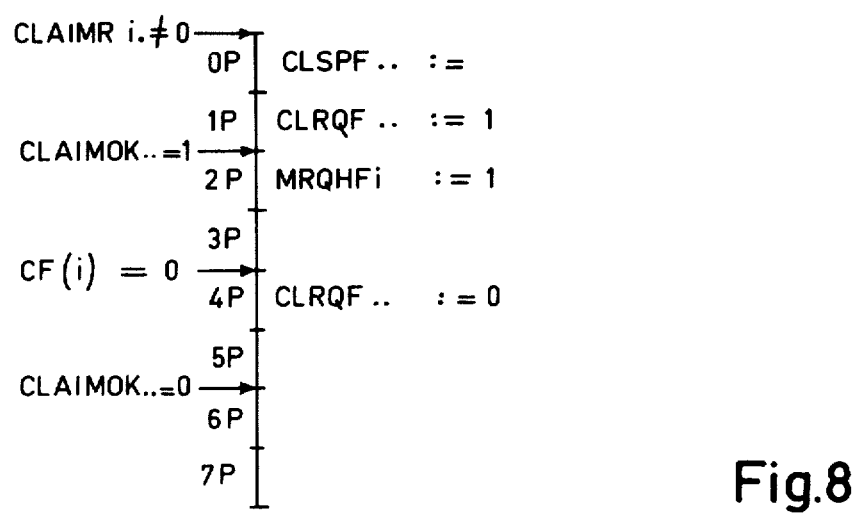
FIG. 8 shows a third counter.

FIGS. 4 and 5 show additional parts so as to enable a claim cycle to be performed. Furthermore, a third counter as diagrammatically shown in FIG. 8 is provided per active unit for each store, in total four in this case. Moreover, two fourth counters which are diagrammatically shown in FIG. 9 are provided. A claim cycle comprises reading, modifying, and writing. During modification, the contact between process and store is interrupted, and normal cycles of other processes can take place in the same store.

It is again assumed that the process 2 in the active unit PROCA wishes to perform a claim cycle as regards the store BANK0. The same takes place as in the case of a normal cycle and, moreover, the bistable element CFs of FIG. 4 is set to the 1-state. If there is no other claim request with respect to the store BANK0, this claim request is converted into a normal request. The other claim request can originate in PROCA as well as in PROCB. For the time being the claim request will be ignored because the bistable element MRQHF2 is still in the 0-state: a claim request is thereby distinguished from a normal request.

The logic AND-gate AND 9 in FIG. 4 receives two logic 1-signals, i.e. from the bistable element CF2 and the inverted value of the first bit (a0) from the register ADREG2. In reaction to the next clock pulse 0, the third counter present in the active unit PROCA is activated with respect to the store BANK0 (FIG. 8), and the number 2 of the process which wishes to perform a claim request is stored in the 2 bistable elements CLSPFA0 in binary code via the priority determining unit PR2 and the decoder DEC. 2 In reaction to the next clock pulse 1, the bistable element CLRQFA0 is set to the 1-state via the logic OR-gate OR2, with the result that the signal CLAIMREQA0 arrives at the switching unit SWITCH as a logic 1. If this signal or the signal CLAIMREQB0 which corresponds thereto is present on an input of the logic OR-gate OR6 at the end of a clock pulse 1, the fourth counter (FIG. 9) assigned to the store BANK0 is advanced under the control of the clock pulse 2 and, in addition, the bistable element CLF0 is set to the 1-state. Furthermore, possible via the priority determining unit PR6, the information as regards which active unit is granted access in a claim cycle to the store BANK0 is stored in the bistable element CLSPF0: the relevant store is then claimed. In reaction to the next clock pulse 3, the bistable element CLOKFA0 is set to the 1-state under the control of the bistable element CLF0 and the state of the bistable element CLSPF0 (now 0). If a 1 was stored in CLSPF0, however, the bistable element CLOKFB0 would be set to the 1-state: the approval signal is now present. In reaction to the next clock pulse 2 (i.e. almost one clock pulse cycle later), the signal CLAIMOKA0 is present for the active unit PROCA. The bistable element MRQHF2 is then set to the 1-state and the request will be further dealt with as in a normal cycle by means of the already described counters, gates and priority determining units. The only difference is that reading for the purpose of modification can now also take place in the signalling bits.

Reading is followed by modification, the contact between the active unit and the store then being interrupted, but the bistable elements CLOKFA0 remaining in the 1-state. Finally, writing back is performed as alredy described. After termination of the writing, the process (i) (i = 2) autonomously sets the bistable element CF2 to the 0-state. If this is the case at the end of a clock pulse 3, the bistable element CLRQF0 is set to the 0 state in reaction to the next clock pulse 4. In reaction to the next clock pulse 0, the bistable element CLOKFA0 in the switching unit SWITCH is set to the 0-state. If a 1 was stored, this again applies with respect to the bistable element CLOKFB0. After the next clock pulse 1, the said fourth counter stops. The third counter advances only in reaction to the next clock pulse 6, and after the clock pulse 7 it stops and the claim cycle has been completed.

In the foregoing, the circuit elements were always completely indicated (0, 1, or A, B). In FIG. 4, the elements relating to a single process are only denoted by the number thereof. The indication of the counters is substantially omitted and is represented by one or two points (.). The sysmbol := indicatesthat a bistable element is set. An oblique stroke (/) signifies "or." An arrow signifies a necessary condition. The terms IF and ELSE are those which are commonly used in known programming languages such as ALGOL-60. Obviously the Se statements are hardened. The counters shown in FIGS. 6, 7 and 8 can perform each operation only in reaction to a single clock pulse, the counter of FIG. 9 always in reaction to two different clock pulses as indicated.

The foregoing description merely concerned an embodiment according to the invention. In this embodiment two storage accesses can be simultaneously in progress, one active unit always having access to one store and vice versa. For each store there may be one claim request, specified in the bistable elements CLSPF0, 1. These requests can possibly originate from the same unit because there are two sets of bistable elements CLSPFA(0.1). The associated read and write operations must then wait for one another. If specials steps are taken, claim cycles can possibly be given a higher priority than normal cycles.

What is claimed is:

1. A computer configuration comprising:
   at least two data processing units and at least one further unit for transferring data therebetween;
   a switch unit, including
   a bistable status element having a rest and an active state, corresponding rest and active input set lines, and an output indicating when the element is in the active state,
   a bistable claim unit having a free and a claimed state, corresponding free and claimed input set lines, and an output indicating when the unit is in the claimed state;
   at least two stores for storing data, each store including at least one signalling bit location for storing an indication of the activity status of said at least one further unit of said configuration;
   a plurality of first control lines connected between said first and second data processing unit and said switching unit, including
   a first line connected to said rest set line of said bistable status element for carrying read commands,
   a second line connected to the active set line of said bistable status element for carrying write commands,
   a third line connected to said claim input set line of said bistable claim unit for setting said claim unit to said claimed state prior to a first of said read commands,
   a fourth line connected to said free input set line of said bistable claim unit for setting said claim unit to said free position after a first of said write commands; wherein
   said output of said bistable claim unit is connected to at least one of said processing units for blocking said first read command and said first write command, and
   said output of said bistable status element is connected to said at least one of said processing units for blocking said read/write commands to predetermined storage locations in a selected one of said stores when the activity status of the further units is busy.

* * * * *

UNITED STATES PATENT OFFICE
CERTIFICATE OF CORRECTION

Patent No. 3,997,875      Dated December 14, 1976

Inventor(s) Johan Cornelis Broeren

It is certified that error appears in the above-identified patent and that said Letters Patent are hereby corrected as shown below:

Column 1, line 28, "This storage" should be --The storage--
Column 5, line 1, before "is" insert --or--
           line 26, "possible" should be --possibly--
Column 7, line 10, "DEC.2" should be --DEC2.--
           line 21, "possible" should be --possibly--

Signed and Sealed this

Seventh Day of June 1977

[SEAL]

*Attest:*

RUTH C. MASON
*Attesting Officer*

C. MARSHALL DANN
*Commissioner of Patents and Trademarks*